United States Patent Office 2,866,749
Patented Dec. 30, 1958

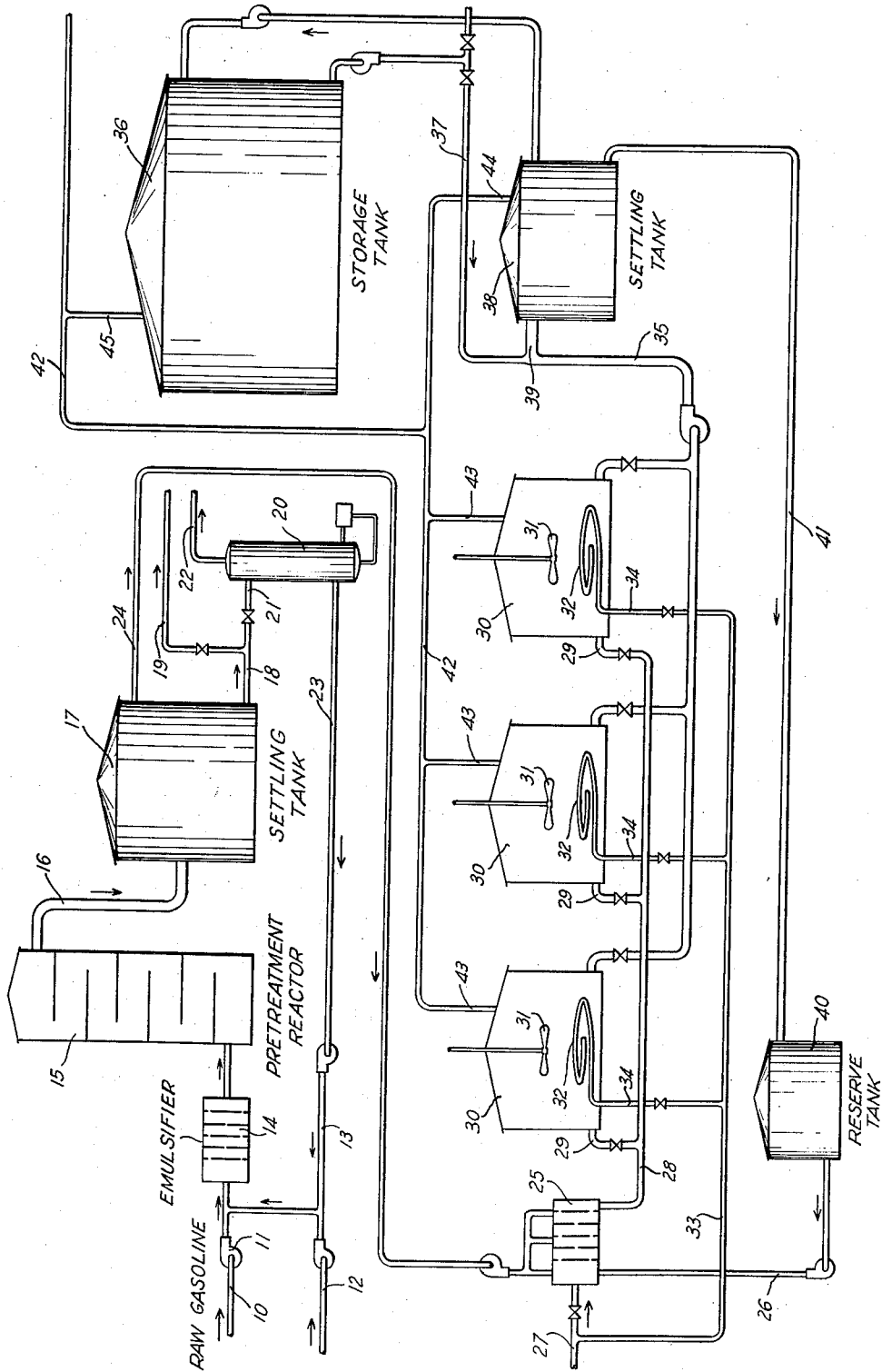

2,866,749

SWEETENING OF MERCAPTAN-BEARING OIL WITH ALKALINE WATER, AIR, AND BENTONITE CLAY

Abraham Shapiro, Pasadena, Calif., assignor to Socony Mobil Oil Company, Inc., a corporation of New York Application February 14, 1955, Serial No. 488,092

7 Claims. (Cl. 208—203)

This invention relates to procedure for reacting liquid materials with gaseous materials which are insoluble therein or nearly so. More specifically, it relates to an oxidation process for sweetening hydrocarbon distillates such as gasoline.

There are numerous known processes for sweetening gasoline, i. e., for removing mercaptans or converting them to less noxious compounds of sulfur. Among these is oxidation by air or oxygen, which converts mercaptans into hydrocarbon disulfides. In such an oxidation process, as in various other operations involving reactions between liquids and gases, it is a problem to maintain the fluids in contact for an adequate period of time without employing an excessive volume of the gaseous substance. Even though the gas be air, which is without cost, the expense of pumping large quantities of it through the liquid is substantial, and when the liquid is a volatile one such as gasoline the tendency of vapors to pass off with the gas is a serious difficulty.

Heretofore the treatment of sour gasoline with air or oxygen has been accomplished by such methods as bubbling the oxidizing gas through the gasoline while the latter is mechanically commingled, as by agitation, with a strong aqueous solution of caustic soda (e. g., about 24%). To avoid excessive loss of vapor it has been customary to conduct the reaction in a pressure vessel to reduce the volatility of the gasoline. Furthermore, in practice it has generally been found necessary to increase the reaction rate by conducting the oxidation at an elevated temperature, which adds to the expense of the process and increases the difficulty of conserving hydrocarbon vapors.

I have discovered an improved method of sweetening gasoline by treatment with an oxidizing gas, which may be economically practiced at atmospheric pressure and temperature and which does not require the use of a concentrated caustic solution. This method includes the emulsification of the sour gasoline with mildly alkaline water, preferably with the aid of an inorganic emulsifying agent such as bentonite, to form an emulsion of sufficient consistency to entrap fine bubbles of air and to retain them for a long period of time. Air or oxygen is dispersed into the emulsion at the time the emulsion is formed, or afterwards, or both. After an interval of from one to twenty-four hours, depending upon the mercaptan content of the sour gasoline, the emulsion is broken (preferably by the addition of previously air-sweetened gasoline) and the gasoline is separated from the alkaline aqueous suspension of bentonite.

Since only a slight quantity of air passes from the emulsion during the reaction period, the vapor loss is little if any greater than that encountered in a gasoline storage tank. Furthermore, the oxidation is facilitated and strong caustic solution is not needed; these new results are only partially explainable by the great interfacial areas among the three phases, and it appears that the emulsifying agent or the condition of emulsification has a catalytic or quasi-catalytic effect upon the reaction.

The use of previously air-sweetened gasoline to break the emulsion also yields an unexpected result, in that it effects additional sweetening if there are still mercaptans in the gasoline at the time the emulsion is broken. Similar use of gasoline sweetened by other methods, such as extraction processes, breaks the emulsion equally well but does not yield the additional sweetening.

A secondary virtue of the new method is that the smaller quantity of air or oxygen and the presence of water as the continuous or external phase minimize the fire hazard which inherently exists when air and gasoline are in contact.

In most cases it is necessary to subject the sour gasoline to a preliminary treatment for removal of acidic substances such as hydrogen sulfide, phenols, naphthenic acids, and sulfonic acids. Various alkaline solutions are suitable for this pretreatment, including aqueous solutions of sodium hydroxide, sodium carbonate, tripotassium phosphate, and amines such as diethanolamine. Some of these solutions have the virtue of being readily freed of hydrogen sulfide by steam stripping, to permit repeated re-use. However, this is of little importance when stronger or less volatile acids are present to a substantial degree, and I ordinarily prefer to use an aqueous solution of sodium or potassium hydroxide, which is only slightly amenable to regeneration by steam stripping. Among the advantages of caustic alkali as compared with the less strongly alkaline materials is that it extracts a substantial proportion of the lower, more reactive mercaptans. This reduces the sulfur content of the finished gasoline and assists the sweetening process.

I prefer to use a modified form of the emulsification technique in the pretreatment step. By dispersing a small proportion of bentonite, such as 0.05%, in the alkaline pretreating solution, it is possible to obtain an unstable emulsion of gasoline in the aqueous fluid, which breaks spontaneously in about fifteen or twenty minutes. Intimate contact for such a period of time is adequate to effect complete neutralization of the gasoline.

After the gasoline is parted from the pretreatment solution, it is emulsified in an aqueous solution having about 1% to 1.5% of sodium hydroxide (or an equivalent proportion of sodium carbonate, potassium hydroxide, or other alkali) and about 0.4% of bentonite. Other emulsifying agents may be substituted. I prefer hydrophilic inorganic agents such as bentonite, ferric hydroxide, and manganic hydroxide, but it is also possible to use organic surface-active agents such as soaps and sodium salts of sulfonic acids if precautions are taken to avoid the use of materials capable of contaminating gasoline and to avoid the formation of excessively stable emulsions.

When the aqueous fluid contains about 0.4% of bentonite as the emulsifying agent, the use of one volume of the aqueous fluid to about three to four volumes of gasoline yields an emulsion of gelatinous appearance and texture which is capable of entrapping fine bubbles of air or oxygen for a long period, which will not break spontaneously until from one to three hours after agitation has ceased, and which is readily broken at any time by the addition of further quantities of gasoline. An emulsion of similar proportions and characteristics is to be preferred regardless of the particular emulsifying agent chosen. Since various agents differ as to emulsifying power, when an agent other than bentonite is used the preferred amount may be somewhat different from 0.4% with respect to the aqueous fluid.

During the emulsification or afterward, a small quantity of air or oxygen is dispersed into the emulsion. The total quantity of oxygen introduced must, of course, be considerably in excess of that theoretically required to react with the mercaptans present, but this does not mean that large volumes of air or oxygen are needed. The proportions of mercaptan sulfur in sour gasoline being so small as to be customarily measured in parts per million, a volume of air equal to half the volume of gasoline treated is ordinarily substantially greater than the quantity theoretically required to sweeten even a very sour gasoline.

After the three-phase emulsion of gasoline, alkaline water, and air is formed, it is permitted to stand for a period of from one to twenty-four hours, during which time oxidation of mercaptans to disulfides proceeds. If the gasoline being treated is only moderately sour, so that it can be sweetened to an adequate degree in not more than two or three hours, it is usually satisfactory to permit the mixed fluids to stand quietly while the reaction occurs. If the sweetening requires a longer period of time, it is preferable to subject the fluids (intermittently or continuously) to agitation or circulation to maintain the emulsion. It may also be desirable to add further quantities of air to insure that an adequate surplus of oxygen is present throughout the reaction period.

The improvement in efficiency of the reaction as compared with that in conventional air-sweetening methods is greater than can be explained solely on the basis of the increase in interfacial areas. I am not able to present a verified theory capable of explaining the phenomenon, but it is reasonable to suppose that the presence of an emulsifying agent is a factor. However, the phenomenon does not seem to be catalysis of the usual kind, since various dissimilar substances having nothing in common except the property of stabilizing emulsions function in the same way.

Mercaptans, especially the higher mercaptans, have extremely slight polar properties and their molecules would ordinarily show no appreciable tendency to remain at an oil-water interface. It may be, however, that the presence of an emulsifying agent or some other interfacial characteristic of emulsions enhances the incipient surface-active property of mercaptans and confers upon them the ability to remain at the interface in spite of the general thermal motion of the molecules.

Such a condition would improve the effectiveness of the reaction not only by increasing the period of time a given mercaptan molecule is immediately available to the reactive oxygen dissolved in the water but also by increasing the concentration of mercaptans at the principal scene of the reaction. Since oxidation proceeding in accordance with the equation

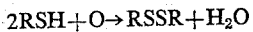

requires the juxtaposition of at least two mercaptan molecules, the latter effect may be of substantial importance.

I do not believe, however, that the oxidation consists entirely of direct reaction between mercaptans and elemental oxygen. It is likely that a considerable portion of the reaction is performed through the medium of hydrocarbon peroxides which are formed by combination of oxygen with unsaturated hydrocarbons. The peroxides are capable of oxidizing mercaptans to disulfides, either at the interfaces or within the gasoline phase.

After the reaction has proceeded to a sufficient degree, which is not necessarily until all the mercaptans have been oxidized, the emulsion is broken by any of various methods, including discontinuance of agitation when that has been employed to maintain the emulsion, the addition of an emulsion-breaking agent, centrifugation, or augmentation of the dispersed liquid phase. I prefer to use the latter method, and I particularly prefer to use previously air-sweetened gasoline for the purpose because of the additional sweetening effected by the addition of such gasoline.

The action of previously air-sweetened gasoline is not readily explainable. The material presumably contains oxidizing agents in the form of hydrocarbon peroxides, dissolved elemental oxygen, or both, but at least an equivalent proportion of available oxygen must be present in the freshly treated gasoline of the emulsion. One hypothesis is that the increased effectiveness of the available oxygen in previously treated gasoline is due to the conversion of elemental oxygen to hydrocarbon peroxides during the ripening period subsequent to the treatment.

After the emulsion is broken the fluids are permitted to stand quietly for a period such as an hour while settling occurs. A completely clean separation of phases is not required at this time; if some water is entrained in the gasoline it eventually settles out in storage tanks, and such gasoline as remains dispersed in the aqueous fluid is merely recirculated through the treater and does no harm.

The aqueous material is essentially unchanged in the process and may be recirculated without regeneration and with very little replacement of components. After a long period of use the solution may become contaminated by accumulation of the minute proportion of acidic substances which may have escaped extraction in the pretreatment or which may have been produced by abnormal oxidation of mercaptans. When the contamination becomes excessive, the entire solution may be replaced.

In the case of a gasoline which includes a high proportion of olefinic constituents, such as a thermally cracked gasoline, oxidation by air or oxygen results in the formation of a substantial amount of gum. Consequently, when such a gasoline is sweetened by the process described above, a redistillation to remove the gums and other high-boiling reaction products is desirable.

The method herein disclosed is not to be considered as limited to the sweetening of gasoline even though, when it is employed for that purpose, it exhibits advantages deriving from phenomena of chemical nature which may not be similarly realized in other reactions. Some of the virtues of the method, particularly the maintenance of great interfacial area and the conservation of the gaseous reagent, are the results of physical phenomena. Therefore, in its aspect as a mechanical technique for creating and prolonging close reactive juxtaposition between liquid and gaseous materials, the method is widely applicable to chemical and physical processes requiring such juxtaposition.

Since there is ordinarily only a minor degree of direct contact between the two dispersed phases of a three-phase emulsion, in those processes in which direct contact between reactants is necessary the liquid to be reacted should be the external or continuous phase of the emulsion. When, as in the sweetening process here described, the second liquid (alkaline water) serves as a carrier for the gaseous reactant (oxygen) by dissolving it without formation of a stable chemical compound, it is permissible and generally preferable that both of the reactant fluids be dispersed and that the second liquid be the continuous phase.

The following are reports of certain bench-scale experiments exemplifying the process as applied to the sweetening of gasoline.

A sample of sour, untreated rerun gasoline was divided into batches of 300 cubic centimeters and each was emulsified with 100 cubic centimeters of an aqueous solution containing 2% by weight of caustic soda and 0.05% of bentonite by mixing with a mechanical stirrer for about five minutes. This emulsion was unstable and separated into two distinct bodies of liquid after about fifteen minutes. The separated aqueous phase contained extracted phenolic substances as well as the major portion of those mercaptans having low molecular weight. The upper, gasoline layer still contained about half the original amount of mercaptans, mostly of high molecular weights.

The pretreated gasoline thus obtained was re-emulsified with 100 cubic centimeters of aqueous solution containing 1% to 1.5% of caustic soda and 0.4% of bentonite by stirring for ten minutes. A small amount of air was introduced both in the bottom aqueous phase and in the emulsified mixture, and a slight air flow was maintained thereafter during the sweetening period. Different samples were subjected to sweetening for various periods of time, and the resulting mercaptan content of the dispersed gasoline was determined. Results were as follows:

|  | P. P. M. |
|---|---|
| Mercaptan sulfur in raw gasoline | 317 |
| Mercaptan sulfur in pretreated gasoline | 124 |
| Mercaptan sulfur in air-treated gasoline: | |
| After 30 minutes | 72 |
| After 1 hour | 63 |
| After 2 hours | 61 |
| After 4 hours | 30 |
| After 22 hours | 12 |

The raw gasoline was negative to the copper strip corrosion test and had an ASTM gum content of 2 mg. The above-described treatment did not change these values.

Four other samples of emulsion were prepared from the same materials and in the same manner, and were allowed to remain quiescent for four hours. At the end of the four hours, the gasoline phases of these emulsions were still sour to the doctor test. Three of the emulsions were resolved by stirring in small portions of previously air-sweetened gasoline, and the separated gasoline was subjected to the doctor test. The fourth sample was handled in the same way except that the gasoline used for resolving the emulsion had been sweetened by the doctor process and not by air-oxidation. The following results were observed:

| Sample | Percent Added Gasoline | | Doctor Test on Resolved Gasoline |
|---|---|---|---|
| | Air-sweetened | Doctor sweetened | |
| A | 10 | | Positive. |
| B | 15 | | Slightly Pos. |
| C | 20 | | Negative. |
| D | | 20 | Positive. |

The percentages are by volume with respect to the emulsion.

In another experiment, thermal gasoline drawn from an acid treater of a California petroleum refinery was neutralized by emulsifying four volumes of the gasoline with one volume of an aqueous solution containing 2% of NaOH and 0.05% of bentonite. Emulsification was achieved by mixing the gasoline into the aqueous fluid and stirring vigorously with a mechanical stirrer for a few minutes. The resulting emulsion was rather unstable and upon remaining quiescent for about fifteen minutes broke into two distinct layers. The upper layer, of neutralized gasoline, was removed and subjected to the following sweetening process.

Four volumes of the neutralized gasoline were emulsified into one volume of an aqueous solution containing 1.5% NaOH and 0.4% bentonite by the same means as used previously. The stirring was carried on for ten minutes while a small stream of air was continually dispersed into the mixture. The rate of air injection was regulated to avoid excessive air breaking through the emulsion surface. The air-saturated emulsion was then allowed to remain quiescent for twenty-four hours. At the end of that period a great portion of the emulsified gasoline had resolved and separated from the aqueous phase.

A portion of the separated gasoline was batch redistilled, using a Badger column. To avoid thermal decomposition, carbon dioxide gas was injected into the still base during redistillation, and the temperature in the still base was not permitted to be higher than 350° F. Two Badger distillations were made, to obtain two distillates with different end points.

The acid-treated raw gasoline employed in this experiment had an offensive odor, a strongly positive doctor test, and more than 300 parts per million of mercaptan sulfur. The sweetened gasoline had the following properties:

| | Without Redistillation | Redistilled Sample I | Redistilled Sample II |
|---|---|---|---|
| Odor | Mild | Mild | Mild |
| Doctor Test | Neg. | Neg. | Neg. |
| Mercaptan Sulfur | None | None | None |
| Total Sulfur, wt. percent | 0.88 | 0.78 | 0.88 |
| Gums, mg./100 ml | 94 | 1 | 2 |
| Gravity, API degrees | 55.7 | 56.8 | 56.7 |
| ASTM Distillation: | | | |
| Initial °F | 116 | 116 | 109 |
| 10% °F | 172 | 175 | 170 |
| 50% °F | 263 | 259 | 263 |
| 90% °F | 341 | 330 | 342 |
| End Point °F | 400 | 362 | 384 |
| Recovery percent | 98 | 98 | 97.5 |

The drawing is a flow diagram, employing conventionalized symbols, which illustrates a semi-continuous commericial form of the process.

Referring to the drawing, a stream of raw gasoline, or gasoline from an acid treatment, is introduced into the system by pipe 10 and pump 11. This is mingled with a stream of alkaline pretreating solution including about 0.05% of dispersed bentonite. The alkaline liquid is fresh material drawn from line 12, recycled material drawn from line 13, or a mixture of both. The combined stream of gasoline and aqueous solution is passed through emulsifier 14, wherein extreme turbulence disperses the gasoline as microscopic droplets in the aqueous solution.

The emulsion thus produced flows to reaction vessel 15, which is provided with baffles to conduct the emulsion through a circuitous course and to insure that all the fluid passing through is subjected to a full reaction time. The capacity of the vessel in relation to the flow rate of the emulsion is such that the reaction period is about fifteen minutes.

From reaction vessel 15 the mixed fluid flows by line 16 to settling tank 17, wherein the emulsion breaks and separates into an upper layer of pretreated gasoline and a lower layer of spent alkaline solution. The resolution of this unstable emulsion is hastened by contact with the separated bodies of liquid in the settling tank.

The aqueous solution is withdrawn from the settling tank by line 18 and, depending upon the nature of the solution and the character of the acidic contaminants it has extracted from the gasoline, it is discarded through line 19, conducted to steam stripper 20 by line 21, or divided into two parts, one of which is discarded while the other is regenerated in the stripper. If used, the stripper discharges gaseous and highly volatile substances such as hydrogen sulfide and lower mercaptans by overhead line 22 and discharges alkaline solution, at least partially regenerated, by line 23. The latter material is returned to emulsifier 14.

The pretreated gasoline is withdrawn from the upper portion of settling tank 17 by line 24 and is injected under pressure into emulsifier 25, wherein it is emulsified with an aqueous alkaline solution from line 26 and with air from line 27. Formation of the emulsion, in which gasoline is the dispersed phase, is facilitated by subdividing the gasoline stream into several portions and injecting them at spaced points along the length of the emulsification zone. The aqueous solution employed is moderately alkaline, having about 1% to 1.5% of NaOH or the equivalent, and it contains about 0.4% of bentonite. From the emulsifier the mixed fluid is conducted by line 28 having branches 29—29 to one of a number of reaction tanks 30—30. When that tank is full, the flow is switched to an empty tank, and the contents of the filled tank are permitted to remain therein for a period of from one to twenty-four hours, depending upon the degree of treatment required.

Each tank 30 is provided with a stirrer 31 and an air-injection coil 32. These need not be used when the gasoline is only moderately sour and the required reaction period is not more than an hour or two. Each air-injection coil is provided with numerous minute orifices and is supplied with compressed air from line 33 having valved branches 34—34.

After the emulsion in a tank 30 has stood for a sufficient period, it is pumped into line 35 and mingled with about a third its volume of previously sweetened gasoline withdrawn from storage tank 36 by line 37. The commingled stream is run into the upper part of settling tank 38 through line 39, which is preferably of large diameter in order to avoid introduction of the fluids into the tank at high velocity.

Tank 38 is large enough to retain the liquids for about an hour, which permits separation into an uper layer of sweetened gasoline and a lower layer of alkaline water containing suspended bentonite. The gasoline is removed into a storage tank, such as tank 36, and the aqueous fluid is pumped to reserve tank 40 by line 41. From the reserve tank the aqueous fluid is returned to emulsifier 25 by line 26.

The amount and composition of the liquid in reserve tank 40 is checked from time to time, and, when necessary, additional materials are added to restore the losses which have occurred by entrainment in the treated gasoline and by evaporation of water. Within limits, the alkalinity of the solution may be restored by addition of alkali, but when the solution becomes greatly contaminated by the salts which eventually accumulate, it is preferable to discard the old solution and to introduce a freshly prepared one.

The vapor spaces of reaction tanks 30—30, settling tank 38, and storage tank 36 are connected into a vapor-recovery system by line 42 having branches 43—43, 44, and 45. The vapor recovery system does not differ from those customarily employed in connection with gasoline storage.

Other embodiments of the method described herein, including batch processes and fully continuous processes, will be readily apparent from the above disclosure.

The term "bentonite" is of somewhat uncertain application as a mineralogical term. It is employed herein, as it usually is in commerce, as denoting any of the hydrophilic "colloidal clays" having the properties of swelling greatly upon contact with water and of forming stable gel-like suspensions in water. Bentonite is said to consist usually of the mineral montmorillonite and less often of other similar minerals such as beidellite; however, those minerals do not invariably occur in a physical form which permits them to exhibit the characteristic properties of bentonite.

I claim as my invention:

1. The method of sweetening a mercaptan-bearing hydrocarbon liquid which comprises: forming an emulsion of about three to four volumes of said hydrocarbon liquid in one volume of alkaline water containing a small proportion of an inorganic emulsifying agent selected from the group consisting of bentonite, ferric hydroxide, and manganic hydroxide, dispersing an oxidizing gas in said emulsion, maintaining said emulsion with dispersed oxidizing gas for a period of at least about one hour and separating said hydrocarbon liquid from said water.

2. The method of sweetening a mercaptan-bearing hydrocarbon liquid which comprises: forming an emulsion of about three to four volumes of said hydrocarbon liquid in alkaline water containing a small proportion of dispersed bentonite, dispersing an oxidizing gas in said emulsion, maintaining said emulsion with dispersed oxidizing gas for a period of at least about one hour and separating said hydrocarbon liquid from said water.

3. The method of sweetening a mercaptan-bearing hydrocarbon liquid which comprises: forming an emulsion of about three to four four volumes of said hydrocarbon liquid in alkaline water containing a small proportion of dispersed bentonite, dispersing an oxidizing gas in said emulsion, maintaining said emulsion with dispersed oxidizing gas for a period of at least about one hour, and subsequently resolving said emulsion by adding thereto hydrocarbon liquid free of mercaptans.

4. The method of sweetening a mercaptan-bearing hydrocarbon liquid which comprises: forming an emulsion of about three to four volumes of said hydrocarbon liquid in alkaline water containing a small proportion of dispersed bentonite, dispersing an oxidizing gas in said emulsion, maintaining said emulsion with dispersed oxidizing gas for a period of at least about one hour, and subsequently resolving said emulsion by adding thereto hydrocarbon liquid previously freed of mercaptans by reaction with an oxidizing gas.

5. The method of sweetening a mercaptan-bearing hydrocarbon liquid which comprises: forming an emulsion of about three to four volumes of said hydrocarbon liquid in one volume of alkaline water containing about 0.4% of dispersed bentonite, dispersing an oxidizing gas in said emulsion, maintaining said emulsion with dispersed oxidizing gas for a period of at least about one hour, and separating said hydrocarbon liquid from said water.

6. The method of sweetening a mercaptan-bearing hydrocarbon liquid which comprises: forming an emulsion of about three to four volumes of said hydrocarbon liquid in one volume of alkaline water containing about 0.4% of dispersed bentonite, dispersing an oxidizing gas in said emulsion, and subsequently resolving said emulsion by the addition thereto of hydrocarbon liquid free of mercaptans.

7. A method as described in claim 6, wherein the resolution of said emulsion is accomplished by adding thereto hydrocarbon liquid previously freed of mercaptans by reaction with an oxidizing gas.

References Cited in the file of this patent

UNITED STATES PATENTS

| | | |
|---|---|---|
| 1,654,581 | Cross | Jan. 3, 1928 |
| 1,890,516 | Lachman | Dec. 13, 1932 |
| 2,641,570 | Ricards et al. | June 9, 1953 |

OTHER REFERENCES

Berkman et al.: "Emulsions and Foams," Reinhold Publishing Corp., N. Y., 1941 (pp. 173 and 324–325 relied on).